Patented Aug. 21, 1934

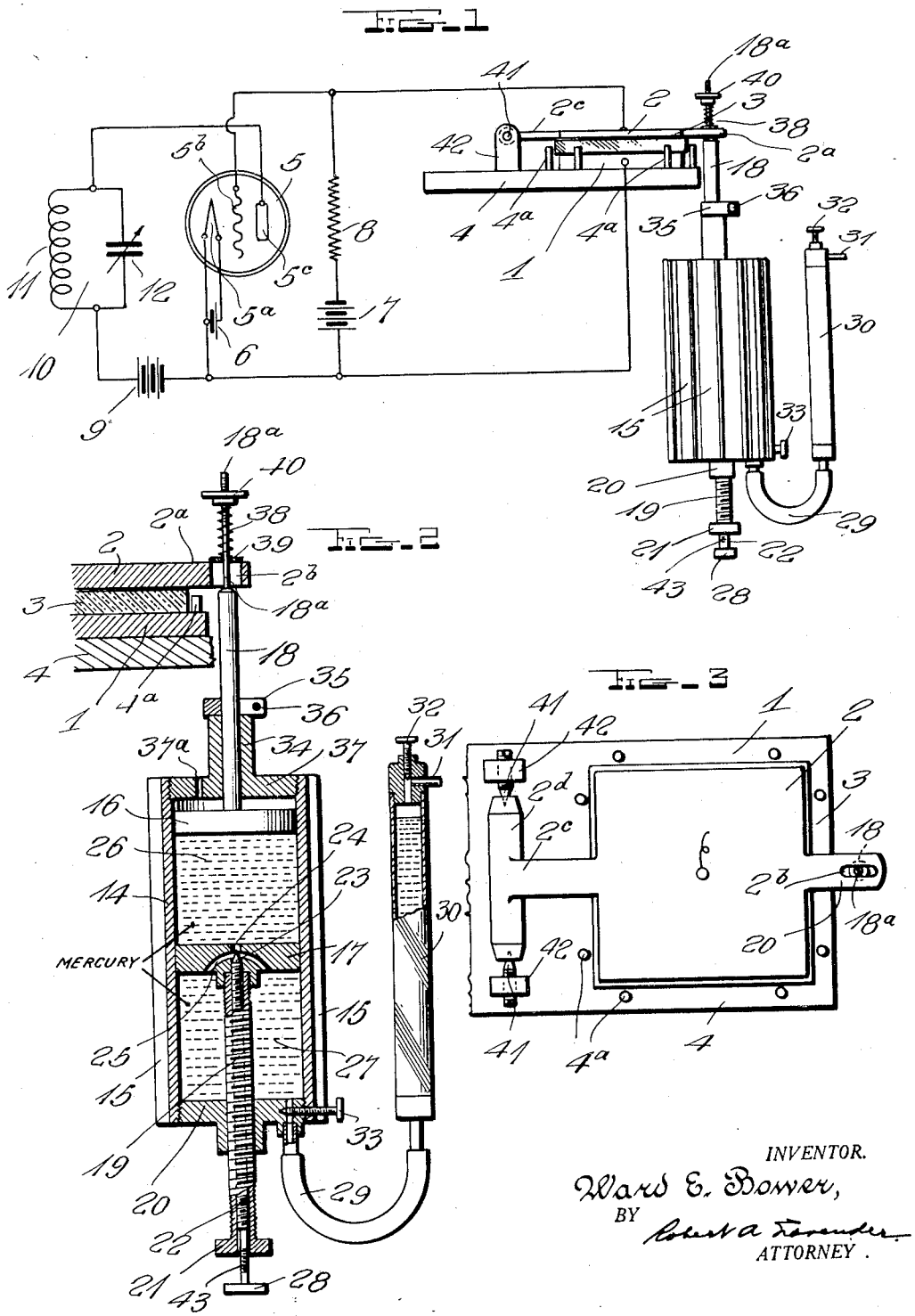

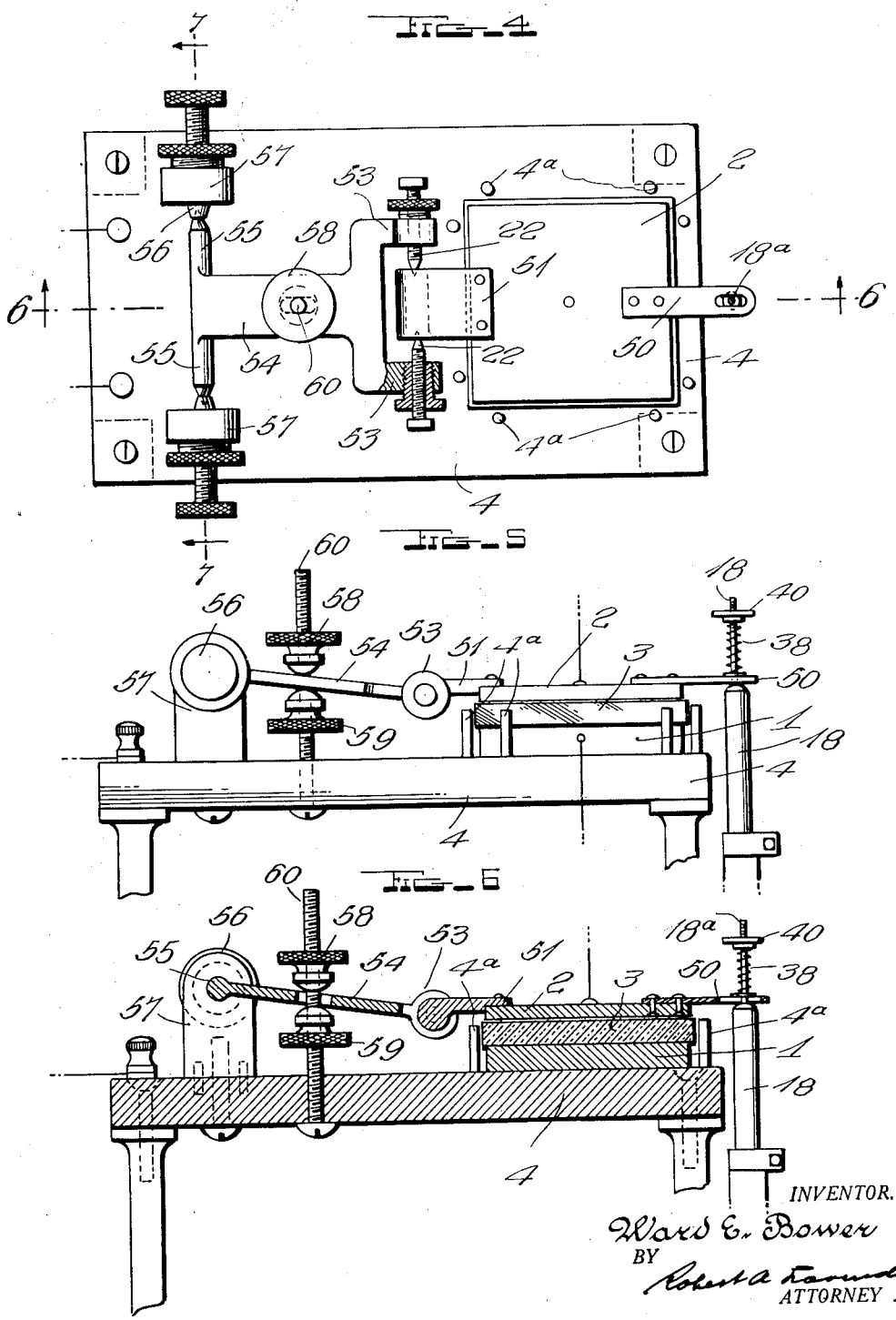

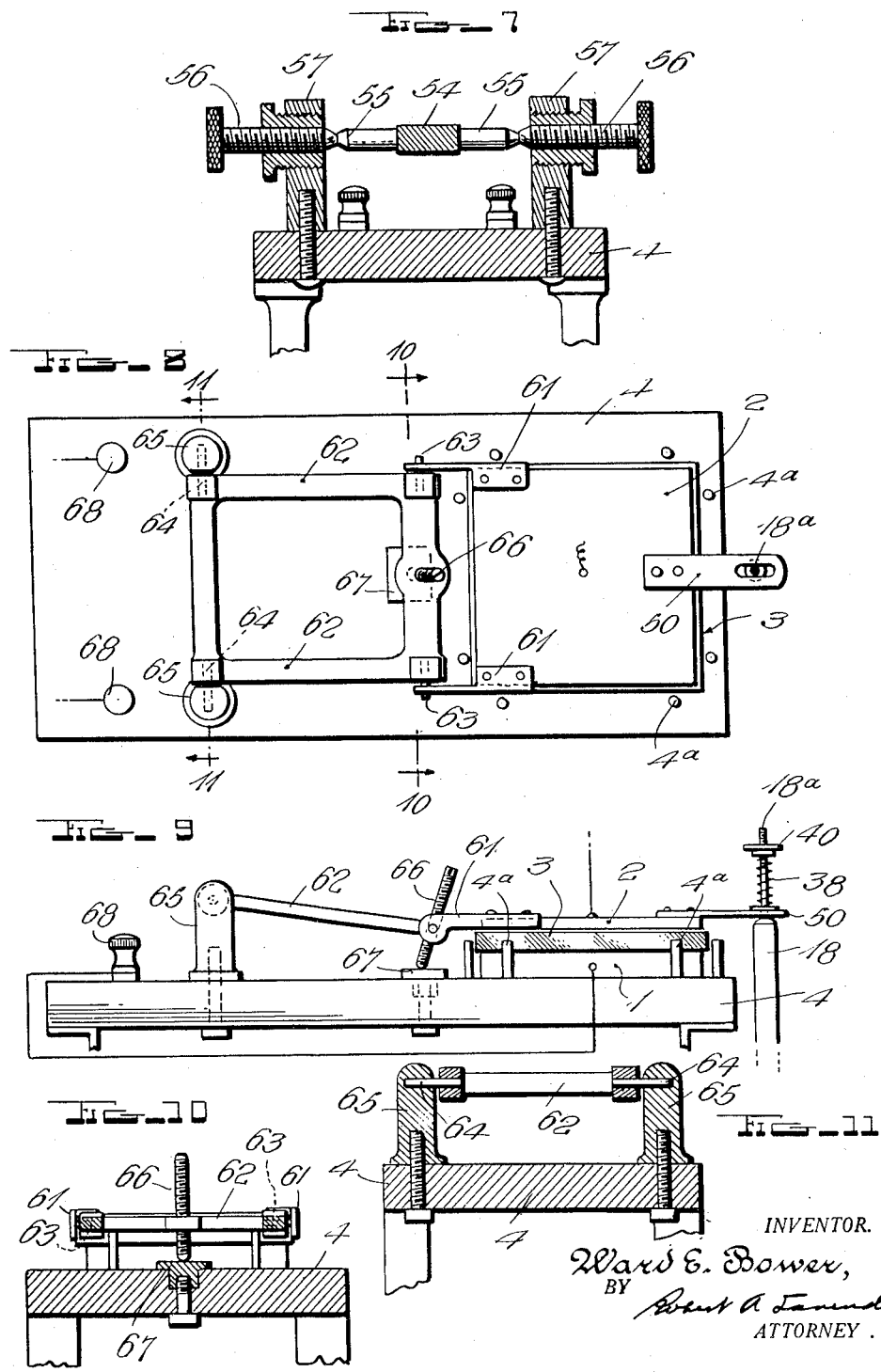

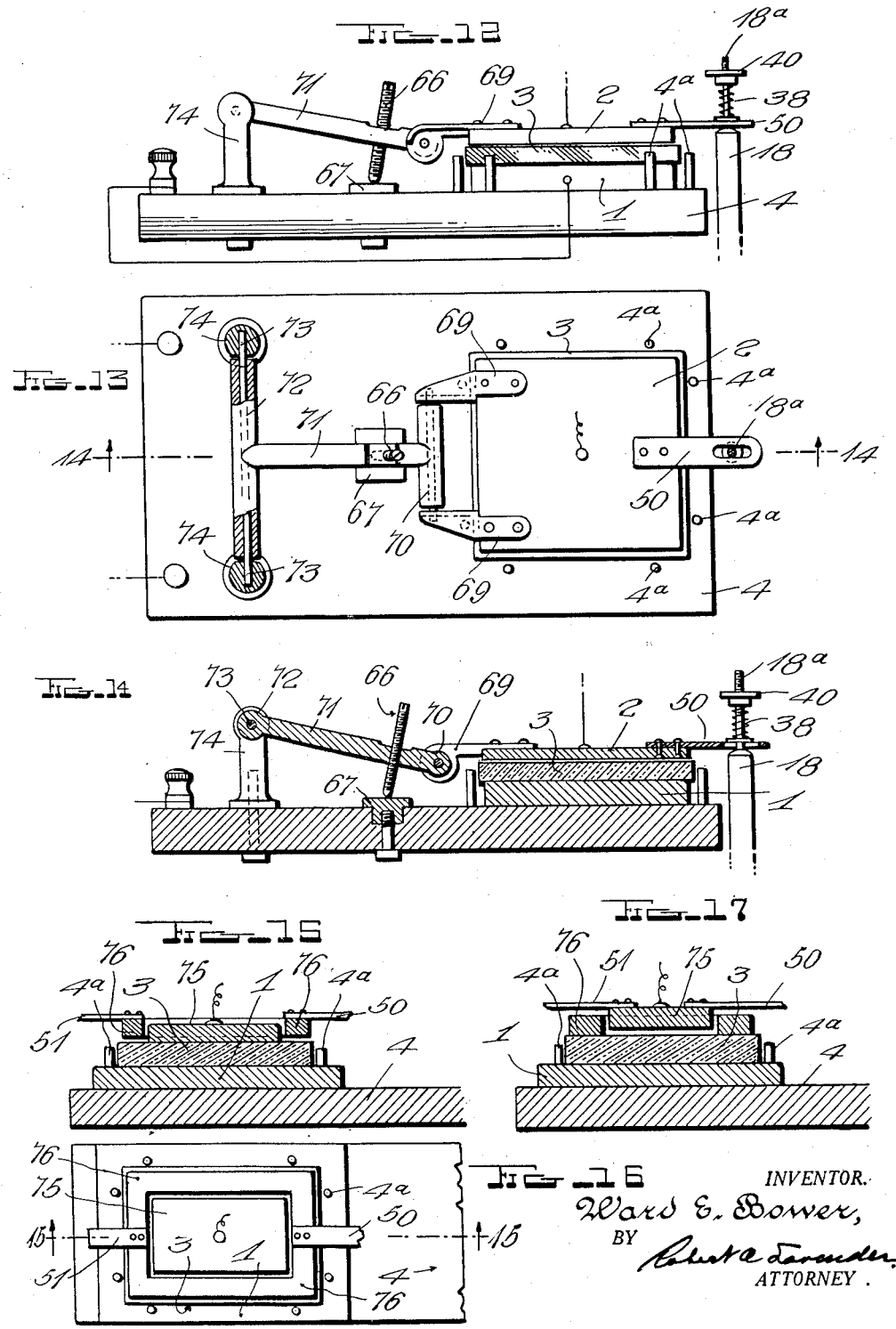

1,970,554

UNITED STATES PATENT OFFICE 1,970,554

APPARATUS FOR COMPENSATING FREQUENCY CHANGES IN PIEZO-ELECTRIC CRYSTALS DUE TO CHANGES IN TEMPERATURE

Ward E. Bower, Washington, D. C.

Application June 22, 1932, Serial No. 618,776

13 Claims. (Cl. 171—327)

(Granted under the act of March 3, 1883, as amended April 30, 1928; 370 O. G. 757)

My invention relates broadly to frequency control systems and more particularly to a method of and apparatus for maintaining the frequency of operation of a piezo electric crystal oscillator system constant independent of changes in temperature within predetermined limits.

One of the objects of my invention is to provide a method of and apparatus for controlling the frequency of a piezo electric crystal controlled oscillator irrespective of changes in temperature conditions immediately around the crystal and within predetermined temperature limits.

Another object of my invention is to provide mechanical control means for controlling the spacial relation of an electrode with respect to the surface of a piezo electric crystal according to temperature conditions for maintaining the frequency of operation of the piezo electric plate substantially constant irrespective of temperature changes within predetermined limits.

Still another object of my invention is to provide a construction of control mechanism for varying the spacial relation of an electrode with respect to the surface of a piezo electric plate in which an expansible medium having a substantial degree of fluidity is utilized to control the spacial relation of an electrode with respect to the upper surface of a piezo electric plate for maintaining the frequency of the oscillator with which the said plate is connected constant irrespective of changes in temperature conditions.

Other and further objects of my invention reside in the structural arrangement for mounting a piezo electric plate and associated electrodes in combination with a fluid controlled mechanism for varying the spacial relation of the upper electrode under control of an expansible medium of relatively high viscosity as set forth more fully in the specification hereinafter following by reference to the accompanying drawings, in which:

Figure 1 schematically shows the piezo electric crystal apparatus of my invention and the temperature controlled means for controlling the spacial relation of the upper electrode with respect to the upper surface of the piezo electric plate, the piezo electric plate being shown electrically connected in an electron tube oscillator circuit for sustaining oscillations at constant frequency irrespective of temperature changes within predetermined limits; Fig. 2 is an enlarged cross-sectional view through the temperature control apparatus and illustrating the association thereof with the piezo electric plate and the upper electrode thereof which is varied in spacial relation with respect to the piezo electric plate; Fig. 3 is a plan view showing one manner of mounting the piezo electric crystal in position whereby the spacial relation of the upper electrode with respect to the surface of the piezo electric plate may be varied according to temperature changes; Fig. 4 is a plan view showing a modified manner of mounting the upper electrode for the piezo electric crystal apparatus and in a position whereby the upper electrode may be varied in spacial relation with respect to the upper surface of the piezo electric crystal; Fig. 5 is a side elevation of the piezo electric crystal showing the manner of mounting the crystal and the manner of controlling the spacial relation of the upper electrode with respect to the upper surface of the crystal; Fig. 6 is a cross-sectional view taken through the piezo electric crystal apparatus of Figs. 4 and 5 on line 6—6 of Fig. 4; Fig. 7 is a lateral cross-sectional view taken through the trunnions which control the pivotal mounting of the upper electrode of the piezo electric crystal apparatus; Fig. 8 is a plan view of a modified construction of mounting for a piezo electric crystal apparatus embodying my invention; Fig. 9 is an elevational view of the mounting for the piezo electric crystal apparatus illustrated in Fig. 8; Fig. 10 is a lateral cross-sectional view taken through the modified form of piezo electric crystal apparatus on line 10—10 of Fig. 8; Fig. 11 illustrates a lateral cross-sectional view taken through the trunnions on line 11—11 of the modified form of piezo electric crystal apparatus; Fig. 12 is a side elevational view of another modified form of piezo electric crystal apparatus embodying the principles of my invention; Fig. 13 is a plan view of the form of apparatus illustrated in Fig. 12; Fig. 14 is a cross-sectional view taken through the apparatus illustrated in Figs. 12 and 13 on line 14—14 of Fig. 13; Fig. 15 shows a modified construction of upper electrode which may be employed in the frequency control apparatus and in which the central portion of the electrode remains stationary on the upper surface of the piezo electric plate while the marginal portion is varied in spacial relation with respect to the upper surface of the piezo electric plate, the view being taken in cross-section on line 15—15 of Fig. 16; Fig. 16 is a plan view of the modified form of piezo electric crystal mounting illustrated in Fig. 15; and Fig. 17 is a cross-sectional view of a further modified construction of piezo electric crystal apparatus in which the marginal portion of the upper plate is maintained fixed upon the upper surface of the piezo electric crystal while the central portion of the electrode is varied in spacial relation to the upper surface of the piezo electric plate for correspondingly controlling the frequency of the oscillator with which the piezo electric plate is connected.

When piezo electric plates are used as a controlling means of frequency stabilization without means of maintaining the surrounding atmosphere at a constant temperature, small changes in frequency will accompany the changes in temperature. Some particular plates with reference to their crystallographic orientation and manner of production show an increase in frequency with an increase in temperature. These plates are known as 30° cut crystals. Other plates of different orientation show a decrease in frequency with an increase in temperature. These plates are known as 0° cut crystals. When piezo electric plates are used as a controlling means of frequency stabilization, without means of maintaining the amplitude of mechanical vibration constant, while the temperature of the surrounding atmosphere is held constant, small changes in frequency will accompany the changes in amplitude. All types of sinusoidal vibrators are subject to this variation as well as all types of oriented crystal plates and modes of vibration. With reference to amplitude, the frequency increases with decrease in amplitude. When piezo electric plates are used as a controlling means of frequency stabilization, two electrodes are used as collecting agents for the piezo electric charges developed on the faces of the particular cut crystal plate used. If no means are taken to insure a constant value of spacing of these electrodes, small changes in frequency will accompany the changes in separation of these plates. All types of sinusoidal vibrators are subject to this variation as well as all types of oriented crystal plates and modes of vibration in said plates. This phenomenon is derived from the law of gravitation where the force of attraction is inversely proportional to the square of the distance separating the objects. In terms of distance separating one electrode from the crystal, called the "gap", the amplitude decreases as the gap increases, resulting in an increase in frequency as the gap increases.

My invention is directed to a method and apparatus which employs these principles in a device such that temperature controls for standard frequency sources may be dispensed with, or in which the ultimate refinements in temperature controls may be dispensed with leaving only an approximate control of temperature necessary for constant frequency operation of the circuits including the piezo crystal element. Although I have shown mercury as the expanding element in the control mechanism, other elements, liquids or gases may be used to control the position of the electrode with respect to the surface of the piezo crystal. It will be understood that the movement of a piston connected to the electrode or electrodes, which it is desired to displace, may be made either directly connected or connection completed through a system of levers. It will be further apparent that the required displacement or gap of the electrode or electrodes may be accomplished by the use of bi-metallic plates, either used as electrodes themselves or through a direct or indirect connection of lever systems.

Referring to the drawings in detail, Fig. 1 schematically shows a piezo crystal apparatus connected in an electron tube oscillator circuit and in which 1 designates a metallic or metal-coated base plate over which is shown mounted an electrode 2. The electrode 2 may be either hinged and caused to move with respect to the crystal with an angular displacement or suspended parallel to crystal face and caused to retract from crystal 3 and parallel with a face thereof. The crystal is maintained in position on base 1 by any suitable means such as pins 4a in base member 4. Electrode 2 and basal electrode 1 are electrically insulated one from the other through base member 4. The oscillator circuit in which the crystal apparatus is connected is shown as including electron tube 5 having cathode 5a, grid 5b and anode 5c. The cathode 5a is heated from any suitable source as represented at 6. The input circuit of the oscillator includes crystal 3 connected through electrode 2, with grid 5b and through electrode 1 with cathode 5a. Bias potential is applied to grid 5b from source 7 through resistance 8. The output circuit of the oscillator contains a suitable source of potential 9 and a tuned circuit 10 consisting of inductance 11 and variable condenser 12. Various methods of mounting the electrodes with respect to each other may be employed as illustrated in Figs. 1–17.

Fig. 2 depicts one type of expanding member, the expanding element in this case being mercury. Housed in an internal cylindrical chamber 14, the outside of which may be finned as shown at 15 to increase the effective radiating area, are two pistons, 16 and 17, and attached to piston 16 is a connecting rod 18 and similarly attached to piston 17 is a hollow externally screw threaded rod 19 passing through a mercury tight cylinder head 20 into which this rod is threaded. The rod 19 is adjusted in and out of cylinder 14 by turning thumb screw 21. Inside this rod 19 is screw threaded another rod 22 at one end of which is operated a needle valve 23 for closing or opening port 24 and passages 25 controlling the volume of mercury in chamber 26 as compared to the volume of mercury in chamber 27. The valve 23 is controlled by turning thumb nut 28 which opens and closes the one or more ports 25 in piston 17. Connected to chamber 27 through a small pipe 29 is a reservoir 30, either of glass or metal, which serves the purpose of replacing the expanding element in case of an accidental spill under control of a valve controlled by the thumb nut 33. At the top of reservoir 30 is an air vent 31 which may be left open or closed air tight by a valve controlled by thumb nut 32. Connected to chamber 26 is a piston rod guide 34 for guiding the piston rod 18 to which is attached a clamp collar 35 controlled by adjusting screw 36, the function of which is to hold rigidly the piston 16 while the ratio of the volume of chamber 26 with respect to the volume of chamber 27 is being changed by adjusting screws 21 and 28.

In operating the apparatus of my invention for the nullification of frequency changes in crystal 3 due to changes in temperature of, for example 30° centigrade, the crystal employed is of the conventional type known as the 0° cut. The law for nullification implies that as the temperature increases, the air gap must increase. Therefore the expanding member of Fig. 2 is connected to the crystal and electrode 2 as illustrated in Figs. 1, 3, 4, 5, 6, 8, 9, 12, 13 and 14 in such a manner that a displacement of piston 16 and rod 18 is communicated directly to electrode 2 or any other equivalent system, raising electrode as the piston 16 is further displaced.

As set forth above, electrodes 2 and 1 are connected to the grid and cathode respectively of any conventional self oscillating tuned plate electron tube circuit. The volume of mercury in chamber 26 is adjusted in the following manner. The rate of change of frequency against the spacial distance between the electrode 2 and the upper surface of crystal 3, that is the air gap distance, may be taken experimentally and the volume of chamber 26 calculated to approximately fit the law required from the coefficient of expansion of the expanding element used. The volume of chamber 26 may now be adjusted to this approximation. It is assumed that piston 16 is pushed up as far as possible against cylinder head 37 confined air being released through port 37a. This may be accomplished in the following manner:

(a) Open discharge port 31 by unscrewing valve cocks 32 and 33 and turning adjusting screw 21 clockwise, previously having filled chambers 26, 27 and reservoir 30 with mercury until resistance is felt as adjusting screw 21 is turned.

(b) Clamp piston connecting rod 18 at 36 for limiting movement of piston 16.

By a graduated scale on or adjacent the screw 22 as indicated at 43, the position of piston 17 may be determined and the volume of chamber 26 set to any desired value as follows: Close needle valve 33 which will retain the mercury in chambers 26 and 27 as piston 17 is varied in position. Open mercury ports 24—25 by unscrewing knob 28 for adjusting needle valve 23, then set piston 17 by adjusting screw 21 to the desired value. Next, close needle valve 23 and open valve 33, loosen clamp screw 36 and unscrew adjusting knob 21 until rod 18 is lowered about $\frac{1}{32}$ to $\frac{1}{16}$ of an inch. Connect rod 18 to electrode 2. Electrode 2 is held firmly against connecting rod 18 either by gravity or a coil spring 38 located concentrically about the upper extension 18a of rod 18 and bearing against the washer member 39 which in turn engages the upper portion of the extended tongue 2a of electrode 2 which is slotted at 2b1. Adjusting knob 40 which engages screw threaded rod 18a serves to regulate the tension on spring 38. The tongue 2c on electrode 2 has a lateral extension 2d thereon which is pivoted in trunnions 41 carried in standards 42 mounted on base 4. The crystal is now excited and the frequency measured at temperature $T_1$, say 10° C. Call this frequency $f_1$. Let the temperature come to equilibrium at $T_2$ 20° C. Then from observation of the change in frequency of a beat note produced between $f_1$ and the frequency of a standard oscillator $f_0$, determination is made as to whether the beat note is increased in frequency or decreased in frequency. Assuming that the beat note increased and that the temperature is maintained constant at $T_2$, proceed by closing valve 33, opening valve 23, and adjusting knob 21 by turning in a direction in this case clockwise, until the original beat note, say 1000 cycles is reproduced. Now close needle valve 23 and open valve 33 and increase the temperature to $T_3$ as for example 30° C. Repeating the foregoing steps as the temperature increases to $T_4$ or $T_5$, it will be found that further adjustment is unnecessary for then a volume $V_1$ has been found whose cubical expansion per degree centigrade nullifies the decrease in frequency of the 0° crystal per degree centigrade through the medium of changing the amplitude of vibration of the crystal plate by increasing the gap a certain fraction per degree in temperature. As the temperature is lowered to $T_1$ the beat note will remain quite constant.

The shape of the upper electrode need not be of the conventional type, where the electrode covers the entire crystals as I have found that the electrode 2 may have a stationary portion remaining on the crystal at all times as shown in Figs. 15, 16 and 17, while the portion to be varied may fit within or outside the stationary one, such as a disk for the movable member, working into a square, circular or rectangular shaped stationary member.

In Fig. 4, I have shown the upper electrode 2 provided with an extension strip 50 riveted thereto for engaging a rod 18. The rear of the electrode 2 is connected through plate 51 riveted to the electrode 2 which is engaged by the adjustable screws 52 carried in yoke 53. Yoke 53 has a rearward extension 54 to which there is connected the cross member 55 having pivot points which are received in adjusting screws 56 which extend through the standards 57 secured on base 4. A pair of adjustable limiting stops 58 and 59 are screw threaded upon the vertically projecting screw 60 which passes through an aperture in the extension 54 as shown. Adjustment of the limiting stops 58 and 59 serves to selectively set the upper electrode 2 in a predetermined position with respect to the upper surface of the piezo electric crystal 3.

In the structure shown in Figs. 8–11, I provide a micrometer adjustment mechanism for fixing the spacial relation of the upper electrode 2 with respect to the upper surface of the piezo electric plate 3 by an arrangement of rearwardly extending projections 61 on electrode 2. Between the projections 61, I provide a frame member 62, one end of which has pivotal connections 63 with the extensions 61. The opposite end of the frame 62 is provided with pivotal connections 64 with vertically disposed standards 65 mounted on base 4. The frame 62 is adjusted with respect to base 4 by means of set screw 66 which passes through the end portion of frame 62 and engages the plate 67 secured on base 4. Binding posts 68 are mounted on base 4 for establishing electrical connection with lower electrode 1 and upper electrode 2 with the frequency control circuit.

In the arrangement shown in Figs. 12–14, I provide projections 69 at the rear edge of the upper electrode 2 which projections provide means for establishing pivotal connections with cross-arm 70. Cross-arm 70 is carried by the arm 71 which extends normal to arms 70 and terminates in cross-arm 72. Cross-arm 72 is pivoted at 72 in standard 74. Adjustment of arm 71 for effecting micrometer adjustment of the position of the pivot for upper electrode 2 is carried out by means of screw 66 bearing against plate 67 in a manner similar to the structure described in Figs. 8–11. The upper electrode 2, as heretofore noted, does not have to be varied in special relation to the upper surface of piezo electric plate 3 throughout the entire area of the piezo electric plate 3. As shown in Figs. 15 and 16, the upper electrode 2 is divided into a central stationary rectangular portion 75 and a peripheral movable portion 76. The peripheral movable portion is substantially a frame which closely conforms to the shape of the inner plate 75.

As shown in Fig. 17, the upper electrode 2 may have the peripheral portion 76 stationary upon the upper surface of the piezo electric crystal 3 while the central movable portion 75 is varied in spacial relation with respect to the upper surface of the piezo electric plate 3.

The frequency control apparatus of my invention has been found to be highly practical in its construction and efficient in its operation, and while I have described certain preferred structures for carrying out the method of my invention, for compensating for frequency changes due to changes in temperature of the piezo electric crystal, I desire that it be understood that modifications may be made and that no limitations are intended other than are imposed by the scope of the appended claims.

The invention herein described may be manufactured and used by or for the Government of the United States of America for governmental purposes without the payment of any royalties thereon.

What I claim as new and desire to secure by Letters Patent of the United States is as follows:

1. Piezo electric crystal apparatus comprising a base member, a lower electrode mounted on said base member, a piezo electric crystal contacting with said lower electrode, an upper electrode aligned with the upper surface of said piezo electric crystal, projections extending in opposite directions from said upper electrode, means engaging one of said projections for raising said upper electrode, and means engaging the other of said projections for providing a pivotal axis about which said upper electrode moves in controlling the spacial relation between said upper electrode and the upper surface of said piezo electric crystal.

2. Piezo electric crystal apparatus comprising a supporting base, a lower electrode carried by said supporting base, a piezo electric crystal having its lower surface resting in contact with said lower electrode, an upper electrode aligned with the upper surface of said piezo electric crystal, means connected with one end of said upper electrode for raising and lowering said upper electrode with respect to the upper surface of said piezo electric crystal, means connected with the other end of said upper electrode and providing a journal about which said upper electrode is arranged to be angularly moved, and means for adjusting the position of said journal with respect to said base.

3. Piezo electric crystal apparatus comprising a supporting base, a lower electrode carried by said supporting base, a piezo electric crystal having its lower surface resting in contact with said lower electrode, an upper electrode aligned with the upper surface of said piezo electric crystal, means connected with one end of said upper electrode for raising and lowering said upper electrode with respect to the upper surface of said piezo electric crystal, means connected with the other end of said upper electrode and providing a journal about which said upper electrode is arranged to be angularly moved, and a screw device adjustable between a portion of said journal and said base for controlling the position of said journal above said base.

4. Piezo electric crystal apparatus comprising a base, a lower electrode carried by said base, a piezo electric crystal having its lower surface resting in contact with said lower electrode, an upper electrode aligned with the upper surface of said piezo electric crystal, an extension on one end of said upper electrode, means engaging said extension for raising and lowering said electrode for varying the spacial relation thereof with respect to the upper surface of said piezo electric crystal, an extension on the other end of said upper electrode, a journal member engaging said last mentioned extension, and a screw threaded device supported in said base and having adjustable screw threaded members thereon engaging opposite sides of said journal member for adjusting the position of said journal member from said base.

5. Piezo electric crystal apparatus comprising a base, standards carried by said base, a laterally extending member journaled intermediate said standards, an arm connected with said laterally extending member and extending above said base normal to said laterally extending member, a lower electrode carried by said base, a piezo electric crystal having its lower surface in electrical connection with said lower electrode, an upper electrode aligned with the upper surface of said piezo electric crystal, a pivotal connection between said arm and one end of said upper electrode, and means connected with the other end of said upper electrode for raising and lowering said upper electrode with respect to the upper surface of said piezo electric crystal.

6. Piezo electric crystal apparatus comprising a base, a lower electrode carried by one end of said base, a standard carried by the opposite end of said base, a piezo electric crystal having its lower surface resting in contact with said lower electrode, an upper electrode aligned with the upper surface of said piezo electric crystal, a frame member journaled in said standard, an extension on one end of said upper electrode, a pivotal connection between said extension and said frame member, screw means for adjusting the position of said pivotal connection above said base, and means extending from the opposite end of said upper electrode for raising and lowering said upper electrode with respect to the upper surface of said piezo electric crystal.

7. Piezo electric crystal apparatus comprising a base, a lower electrode carried by said base, a piezo electric crystal mounted on said lower electrode, an upper electrode aligned with said piezo electric crystal, means for pivotally mounting one end of said upper electrode and means for raising and lowering the other end of said upper electrode comprising a rod member, a piston carried by said rod member, a cylinder in which said piston is operative and a viscous expansible material in said cylinder for variably controlling the movement of said piston in accordance with changes in temperature for correspondingly controlling the spacial relation of said upper electrode with respect to the upper surface of said piezo electric crystal.

8. Piezo electric crystal apparatus comprising a base, a lower electrode on said base, a piezo electric crystal mounted on said lower electrode, an upper electrode aligned with the upper surface of said piezo electric crystal, means for pivotally supporting one end of said upper electrode, means connected with the other end of said upper electrode for controlling the spacial relation of said upper electrode with respect to the upper surface of said piezo electric crystal by movement of said upper electrode in planes parallel with the upper surface of said piezo electric crystal.

9. Piezo electric crystal apparatus comprising a base, a lower electrode carried by said base, a piezo electric crystal mounted on said lower electrode, an upper electrode aligned with the upper surface of said piezo electric crystal, means for pivotally mounting one end of said upper electrode, a cylinder, a piston operative in said cylinder, a piston rod connected with said piston and engaging said upper electrode, a body of viscous expansible material in said cylinder and adjustable means for admitting said viscous expansible material against said piston for controlling the movement of said piston in accordance with temperature changes and correspondingly controlling the spacial relation of said upper electrode with respect to the upper surface of said piezo electric crystal.

10. Piezo electric crystal apparatus comprising a base, a lower electrode carried by said base, a piezo electric crystal mounted on said lower electrode, and an upper electrode for said piezo electric crystal comprising a peripheral portion and a central inner portion each aligned with the upper surface of said piezo electric crystal, and means for varying the spacial relation of one of the portions of said upper electrode with respect to the upper surface of said piezo electric crystal while maintaining the other portion stationary on the upper surface of said piezo electric crystal.

11. Piezo electric crystal apparatus comprising a base, a lower electrode carried by said base, a piezo electric crystal mounted on said lower electrode, and an upper electrode for said piezo electric crystal comprising a peripheral portion and a central inner portion, and means for varying the spacial relation of the peripheral portion of said upper electrode with respect to the upper surface of said piezo electric crystal while maintaining the central inner portion of said upper electrode stationary upon the upper surface of said piezo electric crystal.

12. Piezo electric crystal apparatus comprising a base, a lower electrode carried by said base, a piezo electric crystal mounted on said lower electrode, and an upper electrode for said piezo electric crystal comprising a peripheral portion and a central inner portion, and means for varying the spacial relation of the central inner portion of said upper electrode with respect to the upper surface of said piezo electric crystal while maintaining the peripheral portion of said upper electrode stationary upon the upper surface of said piezo electric crystal.

13. Piezo electric crystal apparatus comprising a base, a lower electrode mounted on said base, a piezo electric crystal having its lower surface resting in contact with said lower electrode, an upper electrode, means for pivotally mounting one end of said upper electrode, means engaging the other end of said upper electrode for varying the spacial relation of said upper electrode with respect to the upper surface of said piezo electric crystal comprising an actuating rod, a piston on said rod, a cylinder in which said piston is operative, an adjustable partition member in said cylinder, and a micrometer valve in said partition adjustable from the exterior of said cylinder for flowing an expansible medium into said cylinder and operative against said piston for imparting movement to said rod for varying the spacial relation of said upper electrode with respect to the upper surface of said piezo electric crystal in accordance with changes in temperature.

WARD E. BOWER.